C. W. CHEEK.
AXLE LUBRICATOR.
APPLICATION FILED AUG. 28, 1913.
1,205,856.
Patented Nov. 21, 1916.
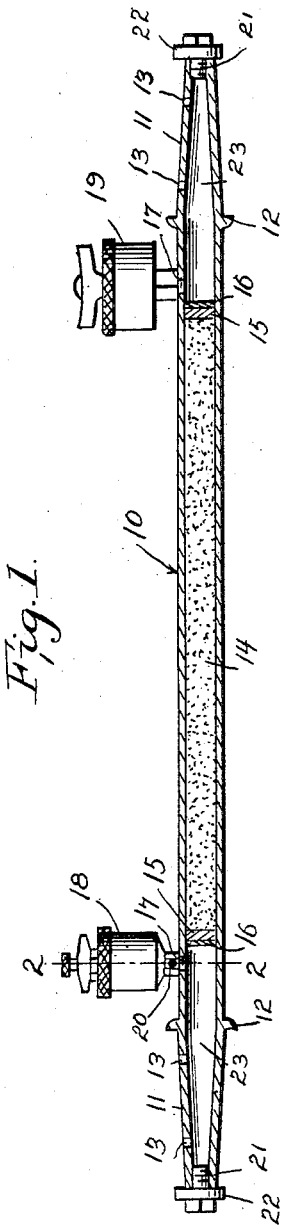
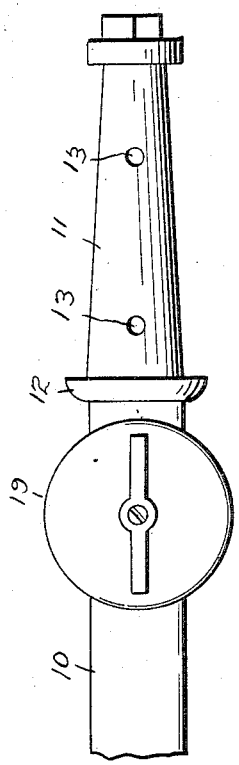
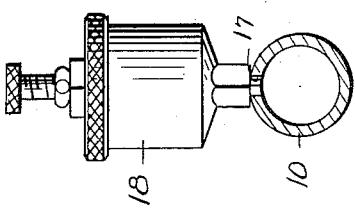
Witnesses
R. H. Jones
E. N. Jeter
Inventor
C. W. Cheek.
By
Attorney

UNITED STATES PATENT OFFICE.

CHARLES W. CHEEK, OF EAST CHATTANOOGA, TENNESSEE.

AXLE-LUBRICATOR.

1,205,856.   Specification of Letters Patent.   Patented Nov. 21, 1916.

Application filed August 28, 1913.   Serial No. 787,181.

*To all whom it may concern:*

Be it known that I, CHARLES W. CHEEK, a citizen of the United States, residing at East Chattanooga, in the county of Hamilton and State of Tennessee, have invented certain new and useful Improvements in Axle-Lubricators; and I do hereby declare the following to be a full, clear, and exact description of the invention, such as will enable others skilled in the art to which it appertains to make and use the same.

This invention comprehends improvements in axle lubricators for vehicles and relates more particularly to those of the type wherein a lubricant is forced through a bore or channel in the wheel spindle and through openings in said spindle to the wheel boxing.

One of the objects of the invention resides in the provision of a lubricating device of this nature which shall be of extremely simple construction, cheap to manufacture, and very practical.

The invention also aims to adapt a hollow axle for use as a lubricant container and conveyer by closing the central portion thereof so that the lubricant will not flow therein.

With these and other objects in view, as will become more apparent as the description proceeds, the invention consists in certain novel features of construction, combination, and arrangement of parts, as will be hereinafter described and claimed.

For a complete understanding of my invention, reference is to be had to the following description and accompanying drawings, in which, Figure 1 is a vertical longitudinal sectional view through a hollow axle equipped with my lubricating device, the grease cups being shown in elevation, Fig. 2 is a view taken on the plane of line 2—2 of Fig. 1, with the grease cups shown in elevation, Fig. 3 is a fragmentary top plan view of one end of the axle.

Referring in detail to the drawing by numerals, 10 designates, generally, a hollow axle having its extremities tapered to form the spindles 11 and formed with collars 12 at the inner ends of the spindles.

My invention contemplates the forcing of the lubricant into the axle and out of the openings 13 formed in the upper sides the spindles so that the wheels will be properly lubricated and in order that it will not be necessary to use an undue amount of lubricant, some means must be provided for stopping up the central portion of the axle. I accomplish this by placing a sawdust packing 14 within the central portion of said axle, the packing being held in place by means of preferably felt disks 15 and layers of tar or pitch 16. The pitch renders the felt disks impervious and holds them in position. Openings 17 are formed in the tops of the axles just outside of the closed portion thereof and suitable grease cups 18 and 19 are secured within these openings. Any suitable form of grease cup may be used, and for the purpose of illustration I have shown an automatic force feed cup 18 and a manual force feed cup 19. A valve 20 is provided to control the flow of grease from the cup 18 into the axle. The ends of the axle are closed by threaded plugs 21 having heads 22 formed thereon which retain the wheels in proper position.

It will be seen that a lubricant may be forced from the grease cups 18 and 19 into the chambers 23 and through the openings 13 so as to properly lubricate the exterior of the wheel spindles. Whenever it is desired to clean these chambers or passages the plugs 21 may be removed and a wire inserted through the ends of the axle or some of the grease forced through these open ends, the grease carrying the foreign matter with it.

It will be understood that the grease cups may be secured to the side of the axle if desired and that the channels or passages 23 may be made of any suitable length.

From the foregoing description taken in connection with the accompanying drawings, it will be apparent that I have provided axle lubricators of extremely simple and inexpensive construction, practical, capable of being easily cleaned, and very efficient.

Having thus described my invention, I claim:—

In combination a hollow axle having tapered ends, a saw dust filling arranged centrally within said axle, plugs snugly fitted in said axle and positioned against the opposite ends of said filling, and a coat of adhesive material applied to the opposed outer faces of said plugs.

In testimony whereof I affix my signature in presence of two witnesses.

CHARLES W. CHEEK.

Witnesses:
M. R. NEHUS,
W. R. RUYLOR.

Copies of this patent may be obtained for five cents each, by addressing the "Commissioner of Patents, Washington, D. C."